United States Patent Office 3,349,683
Patented Oct. 31, 1967

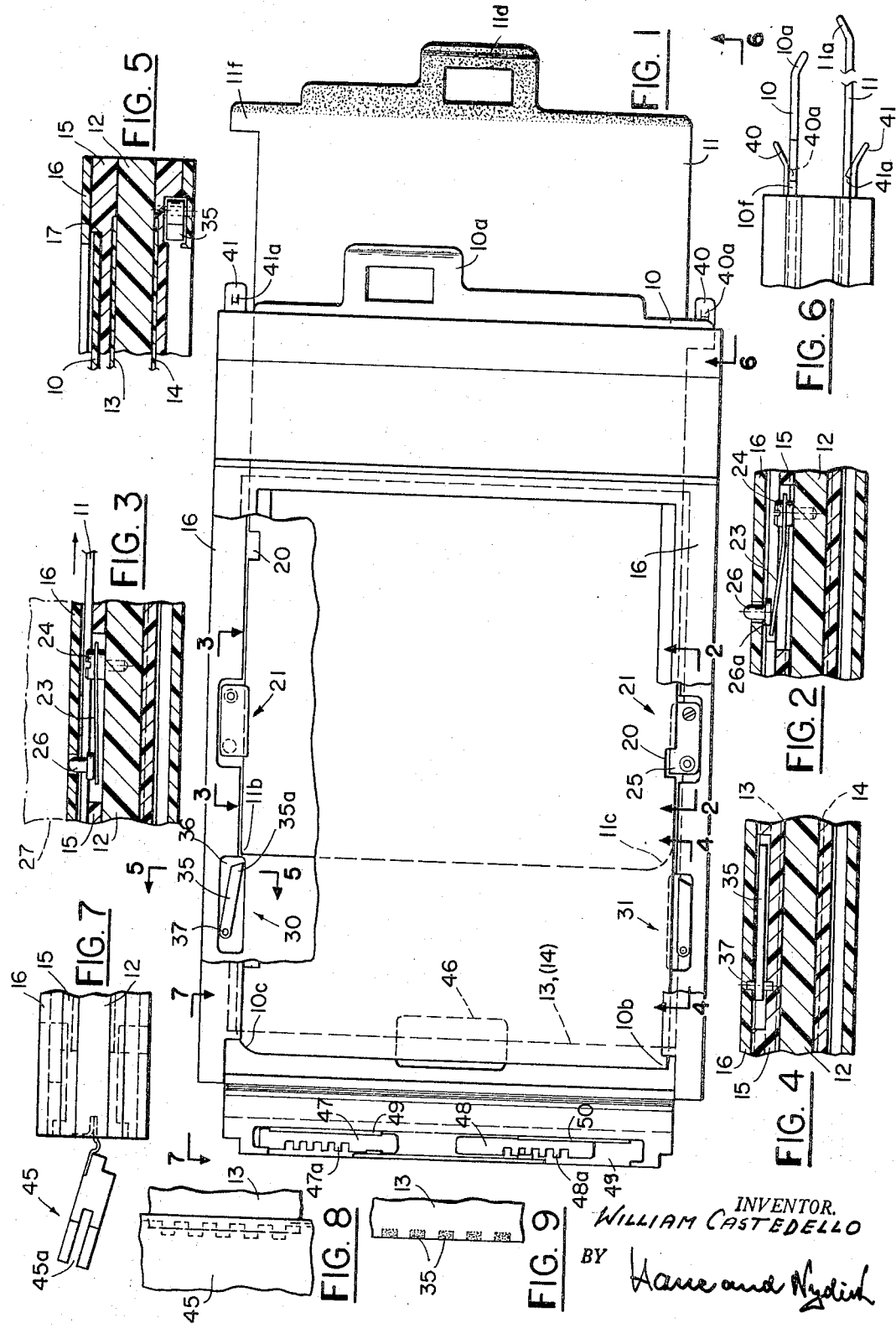

3,349,683
PHOTOGRAPHIC CUT-FILM OR PLATE HOLDER
William Castedello, Plainville, Conn., assignor to The Kalart Company Inc., Plainville, Conn., a corporation of New York
Filed June 3, 1965, Ser. No. 461,048
3 Claims. (Cl. 95—66)

ABSTRACT OF THE DISCLOSURE

A photographic cut film or plate holder of either the single or the double type in which reinsertion of the slide, after withdrawal of the same for uncovering a film or a plate in the holder, is blocked unless the slide is reversed prior to reinsertion, and in which the slide is automatically locked after initial insertion thereof until the holder is inserted in a camera. The holder is further equipped with locking means preventing an accidental dislodging of the slide covering an exposed film. Finally, the holder is equipped with means for conveniently identifying a specific developed film or plate.

---

The present invention relates to photographic film holders of either the single or the double type.

It is customary to mark differently the two sides of the slides of such holders, a white or silver marking generally indicating an unexposed film in the holder and a black marking an exposed one. The general practice is to insert a slide with the white marking facing outwardly when the holder is loaded in a darkroom, and the photographer is supposed to reverse the slide after taking a picture so that the now outwardly facing black marking indicates an exposed film covered by the reinserted slide. Practical experience shows that the photographer forgets sometimes to reverse the slide after taking a picture, which may result in a double exposure of a film.

According to the invention, locking means are provided which normally block a reinsertion of the slide unless the same is reversed, but permit a reinsertion of the slide without reversal when the camera with the film holder inserted therein is purposely tilted from the normal position for taking a picture into an upside down or similar position not normally used. Such possibility of reinsertion of the slide without reversal allows the photographer on one hand to reinsert the slide with the non-exposed side thereof facing outwardly, if he decides against taking a picture atfer withdrawing the slide, and on the other hand forces him to perform a specific act before he is able so to reinsert the slide, thus reminding him to insert the slide correctly.

According to another feature of the invention, locking means are provided which automatically lock the slides in the holder upon the initial insertion of the slides when the holder is loaded, and which automatically unlock the slide facing into the camera, that is, the slide covering the film on which a picture is to be taken, when the holder is inserted in the camera, thus effectively preventing an accidental dislodging of a slide.

A further feature of the invention is to provide locking means which automatically lock the slides in the holder after withdrawal of the slides and reinsertion of the same in reversed position. This feature prevents accidental dislodging of a slide covering an exposed film. These last-mentioned locking means may be conveniently released in the darkroom by purposely applying pressure to the same.

Another problem which confronts particularly photographers who use many film holders and take many pictures before the films are developed, such as professional photographers, is to identify the developed film. It is customary to identify films as they are inserted into the holder in the darkroom with a penciled number in the corner of the film. These numbers are usually consecutively marked, and it is rather difficult in the dark to read the number by which the respective holder side is identified and to write that same number with a pencil onto the corner of the film that is inserted into that side of the holder. The photographer must then match his notations on the holder with any separate records in which he has entered the holder numbers and data pertaining to the photographed objects. Such matching up is often time-consuming and difficult. Furthermore, if a holder is lost or damaged, the entire numbering system is upset.

Accordingly, it is a further feature of the invention to provide a marking system which produces markings directly on the film when a picture is taken. Such markings on the film unmistakably identify each film so that the same can be read readily and rapidly matched with the records.

According to the invention, the film will automatically be numbered to coincide with a number that has been set by means of identifying slots on the side of the holder containing that film. The photographer need not write that number with a pencil, which is rather difficult to do in the darkroom. The transfer of numbers from the holder to the film is automatic in the arrangement of the invention, since during exposure the light passing through the identifying slots will automatically identify that film with that side of the holder in which it was contained.

A still further feature of the invention is to make the markings variable so that markings assigned to a lost or damaged holder can be readily transferred to a replacement.

All the afore-described features are combined in a film holder according to the invention so that such film holder is foolproof for all practical purposes, and the features of the invention are provided without appreciably increasing the size and weight of the holder over that of a holder as aforeknown.

While in the previous description, reference has been generally made to film holders, it should be understood that the features of the invention can be equally well used for plate holders.

In the accompanying drawing a preferred embodiment of the invention is shown by way of illustration, and not by way of limitation.

In the drawing:
FIG. 1 is a front view of a double holder according to the invention, one of the slides being shown partly withdrawn;
FIG. 2 is a section taken on line 2—2 of FIG. 1;
FIG. 3 is a section taken on line 3—3 of FIG. 1;
FIG. 4 is a section taken on line 4—4 of FIG. 1;
FIG. 5 is a section taken on line 5—5 of FIG. 1;
FIG. 6 is a section taken on line 6—6 of FIG. 1;
FIG. 7 is a section taken on line 7—7 of FIG. 1;
FIG. 8 is a fragmentary view of the marking means in a position different from that shown in FIG. 1; and
FIG. 9 is a view of the markings as they appear on a developed film.

Referring now to the figures in detail, the holder shown in the figures is a holder of the double type, that is, a holder which can receive two films, one on each side, and accordingly has two slides 10 and 11. The holder should be visualized as being of generally conventional design, except for the aforementioned locking means and marking means. It comprises a casing usually made of plastic. The casing has a center wall 12 which constitutes a backing for the two films 13 and 14 placed in the slide and also separates the two films from each other. Such wall is generally referred to as the septum of the holder. Along the two longitudinal edges of the holder, strips 15 and 16 are secured to form guide tracks 17 for slides 10 and 11, as can best be seen in FIG. 3. Instead of securing separate strips to septum wall 12, the entire casing can, of course, also be molded in one piece. The slides when inserted in the tracks and pushed home provide a light-tight cover for the films placed in the holder.

Each slide has at its upper end a finger grip 10a and 11a, respectively, to facilitate insertion and withdrawal of the slides. Grip 10a is disposed off center, and grip 11a is centered. The top portion of the slide edge, that is, the portion protruding from the holder casing when the slide is fully inserted, is left black on one side and whitened or silvered on the opposite side. The blackened slide is indicated by stippling, as is shown for slide 11. The lower corners of both slides are contoured so that corner 10b is sharp and corner 10c is rounded; similarly, corner 11b is a sharp corner and corner 11c a round corner.

The holder as shown in FIG. 1 should be visualized as being inserted in a camera (not shown) held in upright position so that the slide 11 faces into the camera, that is, covers the film upon which the next picture is to be taken. The slide 10 is shown pushed home into a position such that the white side faces outwardly, and thus signifies that film 13 is unexposed. Slide 11, which covers the film 14 upon which the picture is to be taken next, is shown partly withdrawn.

*Locking means for preventing accidental withdrawal of the slides inserted in a loaded holder*

Let it be assumed that the holder is loaded with film and that the slides are inserted with the correct side, that is, the side bearing whitened marks, facing outwardly. Experience shows that it occurs not infrequently that the photographer accidentally withdraws partly one or both slides, for instance, when pulling the holder out of the usual carrying bag. According to the invention, locking means are provided which prevent such accidental withdrawal. These locking means are shown in detail in FIGS. 1, 2 and 3. They comprise a notch 20 in each slide, which notches coact with catch means 21 provided on the holder casing for each slide. The notch 20 of each slide is so located that it engages the respective catch means 21 when the slide is fully inserted with the whitened side facing outwardly. The notch of slide 10 is shown in that position in FIG. 1. As is shown in FIGS. 2 and 3, the catch means comprises a leaf spring 23 secured at one end to septum 12 by any suitable means, such as a screw 24. Theh free end of the spring terminates in a laterally extending flag 25 and is so biased that the flag will engage the respective notch when the notch and the flag are in registry in the afore-described position of the slide, thus blocking withdrawal of the slide. As is apparent, spring 23 face downwardly so that the leading edge of the slide will push the spring aside during the insertion of the slide. The position of each spring is controlled by a button 26 which is fitted in an opening of strip 16. The button terminates in a collar 26a abutting against spring 23 so that the spring forces the button into the position of FIG. 2, in which the button protrudes slightly from the strip 16.

When a plate holder is inserted into the camera, the frame of the camera, indicated in FIG. 3 at 27, presses the button into a position flush with strip 16. In this position, which is shown in FIG. 3, flag 25 is forced out of notch 20, thereby releasing the slide which faces into the camera, whereas the outside slide remains locked. In the event the photographer should decide to remove the holder without attempting to withdraw the respective slide, the catch spring 23 returns into the position of FIG. 2, thereby automatically relocking the slide.

*Locking means for preventing reinsertion of a slide after exposure of a film without reversal of the slide*

Let it be assumed that the photographer has withdrawn slide 11 and made an exposure. He is then supposed to reinsert the slide in the reversed position.

The locking means shown in FIGS. 4 and 5 enforce such reversal. They comprise catch means 30 and 31, respectively, provided on the holder eaching for each slide, and the catch means are controlled by the configuration of the slide corners 10b, 10c and 11b, 11c. Referring to the catch 30 provided for coaction with slide 10, the catch comprises an arm 35 pivotally fitted in a cut-out 36 formed in casing strips 15 and 16. Arm 35 is freely pivotal in the cut-out by means of a pivot pin 37 and terminates at its free end in a pointed nose 35a. The arm is so balanced that it will tend to turn in clockwise direction, as seen in FIG. 1, until restrained by engagement with an adjacent casing wall. When a slide is fully inserted in its guide track 17, the respective longitudinal edge of the slide pushes the arm back into cut-out 36, but when the slide is withdrawn the arms pivots into the position shown in FIG. 1 by its own weight, provided the camera, and with it the holder, are held in the position of FIG. 1. As is evident, pointed nose 35a protrudes into the guide track for the slide in the position of FIG. 1.

Let it first be assumed that the photographer has withdrawn slide 10 or 11 and after taking a picture, reinserts the slide, correctly reversing the same. Then the corner 10c or 11c will meet the pointed nose 35a and push the arm back, due to its rounded configuration.

Let is now be assumed that the photographer attempts to reinsert the slide without reversing the same; then the sharp corner 10b or 11b will abut against the protruding nose 35a without being able to push the arm back into the cut-out so that further insertion of the slide is prevented. Such stoppage of the insertion of the slide brings it to the attention of the photographer that he should reverse the slide before inserting the same.

The situation may arise that the photographer, after withdrawing a slide, decides that he does not want to take a picture. In such case he wants to and should reinsert the slide without reversing the same. The locking means of the invention permit such reinsertion of the slide without reversal, provided it is intentionally done. To remove arm 35 from its locking position, the photographer simply turns the camera upside down in reference to the position shown in FIG. 1, or at least in a counterclockwise direction through a substantial angle. As a result of such turning, arm 35 will fall back into cut-out 36 by its own weight.

*Locking means for locking the slides in the holder after reinsertion of the slides in reverse position*

After a picture has been taken and the slide is correctly reinserted, it is desirable to lock the slide in the holder to prevent an accidental partial withdrawal of the same. To this effect, further locking means are provided for each slide. These locking means comprise a springy lug 40 for slide 10 and a similar springy lug 41 for slide 11, both protruding from the top edge of the holder casing. Each lug is formed with a nose 40a and 41a, respectively, which engages a flag portion 10f and 11f, respectively, extending from the slides. FIG. 6 shows the coaction between the flag portions and noses 40a or 41a. The slides can be released from the locking noses for withdrawal of the slides in the darkroom by simply exerting a slight pressure on the finger grips 10 or 11a of the slides.

*Marking means*

As has been explained before, it has always been a problem for the photographer to identify the films after development, especially if a large number of films are simultaneously developed. The invention provides simple and effective marking means for the purpose, and these markings means will now be described in connection with FIGS. 1, 7, 8 and 9.

The film holder according to the invention, as does any conventional film holder, has at its lower edge a hinged flap 45 which is hinged to the septum and may be pivoted either in the open position shown in FIG. 7 in full lines or into the closed position shown in FIG. 7 in dotted lines for the left-hand flap. The flap serves to facilitate the insertion of a film in the holder and is tilted for that purpose into the open position of FIG. 7. A finger recess 46 facilitates the removal of the film. The flap has a deep recess 45a which receives the respective marginal portion of the slide and constitutes a light trap when the flap is closed.

The conventionally available flaps are used by the inventor to accommodate the marking means. The marking means are shown as one, or preferably two, marker strips 47 and 48 for each slide. The strips are slidably guided in guides 49 and 50, respectively, and formed with a toothed or serrated edge 47a and 48a. The flaps 45 are cut out at 49 beneath the strips, and the cut-outs are covered by the strips except for the slots between the teeth or serrations of the strips, as shown in FIG. 8. As is evident, the portions of the film behind the slots will be exposed to light when the slide is removed.

Accordingly, markings 35 will automatically appear on the film 13 or 14 after the film has been developed. Such marked film is shown in FIG. 9.

The markings automatically transferred to the film by means of the slots in the strips can be effectively used for a code system. For instance, the markings produced by slots 47a may be somewhat wider than the markings produced by slots 48a. Then the wide markings may represent ten units and the narrow markings one unit. Accordingly, the markings shown in FIG. 9 would signify film holder No. 50. As is readily apparent, any desired differentiation of the markings may be used, and as is further readily apparent, the permanent markings directly on the film make it extremely simple to match up the film with the records normally kept by a photographer.

While the invention has been described in detail with respect to a certain now preferred example and embodiment thereof, it will be understood by those skilled in the art, after understanding the invention, that various changes and modifications may be made without departing from the spirit and scope of the invention, and it is intended, therefore, to cover all such changes and modifications in the appended claims.

The embodiment of the invention in which an exclusive property or privilege is claimed is defined as follows:

1. A photographic cut film or plate holder, said holder comprising a substantially rectangular casing for a cut film or a plate to be photographically exposed, said casing being closed at one end and open at the other end for receiving a slide, a slide insertable into said open end of the casing, said slide being differently marked on opposite sides for visual indication by the marking on the side facing outwardly whether a film or plate in the holder has been exposed, first self-locking means on the casing for locking a slide inserted into the casing with the side thereof indicating an unexposed slide or plate facing outwardly, said locking means including release means actuatable by engagement with a wall portion of a camera in which the holder is inserted, actuation of the release means releasing said first locking means, releasable stop means on the casing biased to move into a slide-locking position upon withdrawal of the slide from the casing, said stop means blocking reinsertion of the slide without reversal thereof in one position of the holder but releasing themselves against said bias for reinsertion of the slide without reversal when the holder is placed in another position, the stop means including a blocking arm mounted freely pivotal in a recess of the holder casing along the insertion path of the slide and balanced in said one position of the holder to protrude into the path of the slide within the casing to block insertion thereof with the side of the slide indicating an unexposed film or plate facing outwardly and in said other position of the holder to pivot out of the insertion path of the slide, said slide having at its leading edge a rounded corner and a sharp corner, the rounded corner pivoting said blocking arm out of the slide path upon insertion of a slide and the sharp corner holding the arm in its protruding position, thereby blocking further insertion of the slide, said corners being so disposed that the rounded corner engages the arm and pivots the same out of its protruding position when the slide is reinserted in the reversed position in which the side of the slide indicating an exposed film or plate faces outwardly, and the sharp corner retains the arm in its protruding position, thereby stopping the slide when reinsertion is attempted without reversal of the slide; actuating means on the slide coacting with said stop means to release the same in any position of the holder for insertion of the slide when the same is reversed from the aforesaid position into the position in which the side indicating an exposed film or plate in the holder faces outwardly, manually releasable second self-locking means for locking the slide when reinserted in said reversed position, and marking means in the form of slots in a portion of the casing covering a film or plate inserted in the same, said marking means producing code markings on the film or plate upon exposure of the film or plate areas underlying the slots of the marking means.

2. A photographic holder according to claim 1, wherein said first self-locking means comprise a springy arm biased into engagement with a notch in an edge of the slide, said notch being in registry with said arm when the slide is fully inserted into the casing with the side thereof indicating an exposed film or plate facing outwardly, and a control button slidable in a wall of the holder casing, said button abutting at one end against said arm and protruding at its other end from the casing, said button being so located that upon insertion of the holder into the camera, the button is pressed by the respective wall portion of the camera into a position in which the button forces said springy arm out of said notch, thereby releasing the slide for withdrawal from the casing.

3. A photographic holder according to claim 1, wherein said second self-locking means comprise a catch for the slide mounted on the holder casing and an extension on the slide engaged with the catch in the fully inserted position of the slide after reversal of the same into the position in which the side thereof indicating an exposed film or plate faces outwardly, said catch and said extension being elastically bendable in relation to each other to release the catch from the extension.

References Cited

UNITED STATES PATENTS

| 1,901,186 | 3/1933 | Norworth | 95—1.1 X |
| 2,326,075 | 8/1943 | Smith | 95—66 |
| 2,462,683 | 2/1949 | Schwartz | 95—71 |
| 2,576,811 | 11/1951 | Schwartz | 95—71 |
| 2,667,812 | 2/1954 | Miller | 95—1.1 X |

JOHN M. HORAN, *Primary Examiner.*